Nov. 11, 1952     L. D. SINGLETON     2,617,642
PENDULUM SCALE LOCK
Filed June 17, 1946
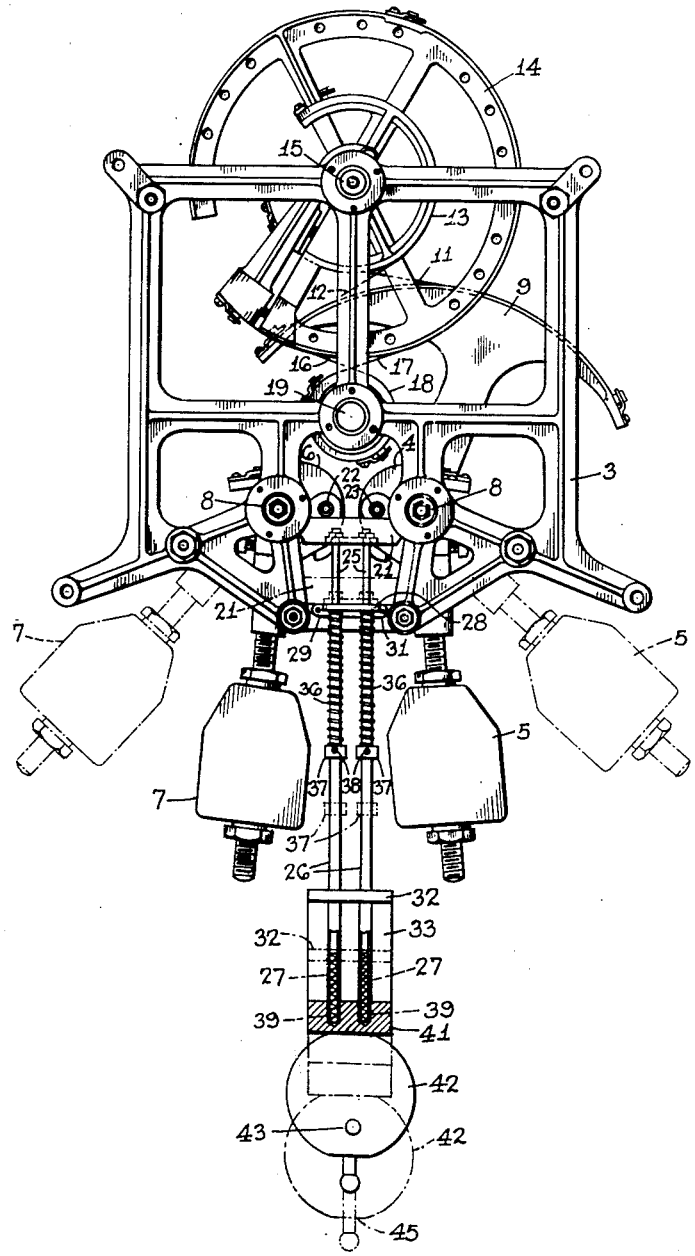
Fig. 1.
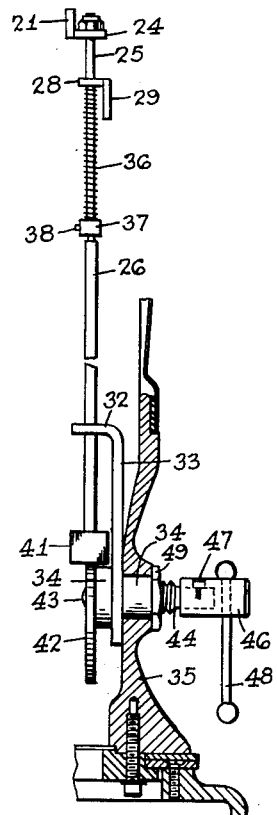
Fig. 2.
INVENTOR.
LESTER D. SINGLETON
BY 
ATTORNEY Patented Nov. 11, 1952

2,617,642

UNITED STATES PATENT OFFICE 2,617,642

PENDULUM SCALE LOCK

Lester D. Singleton, Rutland, Vt., assignor to The Howe Scale Company, a corporation of Vermont Application June 17, 1946, Serial No. 677,220

13 Claims. (Cl. 265—61)

My invention relates to weighing scales of the type having load counterbalancing or offsetting pendulums, and relates more particularly to a locking mechanism for use with weighing scales of this type.

A weighing scale of the type in which the locking mechanism of the present invention may be employed is shown in my application Serial No. 646,883 filed February 11, 1946.

In a weighing scale of the type referred to, it is important that means be provided to prevent injury to the elements of the dial head mechanism, especially when the weighing scale is transported from place to place while in use.

It is an important object of my invention to provide, in weighing machines of the type referred to, an improved means for securing the pendulums against movement, for example, when not in use.

In one aspect my invention comprises an attachment for a weighing scale, wherein there is provided a member which is readily and quickly moved into engagement with means on the pendulum cams to raise and hold said pendulum cams out of pivotal engagement with their bearings, thereby restraining the other elements of the dial head mechanisms against movement.

Other objects of my invention, together with certain details of construction and combinations of parts, will be apparent from the following detailed description and the appended claims.

In the drawings wherein a preferred embodiment of my invention is shown,

Fig. 1 is a rear elevational view, partly in section, of a dial head mechanism, removed from the casing which normally houses the same and which rests on a suitable support, showing the locking mechanism of my invention in position relative thereto but with the tape connections from the tare structure to the pendulum cams omitted in the interest of clarity, and Fig. 2 is a side elevational view, partly in section, of the elements of the locking mechanism of my invention, showing how the said locking mechanism is mounted on the dial head casing.

Like reference numerals indicate like parts throughout both views of the drawing.

Referring now to the drawing, the reference numeral 3 designates the framework supporting the elements of the dial head mechanism. These elements comprise cam 4 of load pendulum 5 and cam 6 of compensating pendulum 7, said cams being pivotally mounted in anti-friction bearings 8. Mounted for movement with load pendulum cam 4 is a tape sector 9 which is connected by flexible tapes 11 and 12 to a translating or input drum sector 13 integral with a multiplying or output drum sector 14. Both drum sector 13 and drum sector 14 are pivotally mounted in an anti-friction bearing arrangement, generally indicated by reference numeral 15, carried in the framework 3. The multiplying drum sector 14 is connected by means of flexible tapes 16 and 17 to a pointer drum 18 which is also pivotally mounted in anti-friction bearings 19 in the framework 3. The operation of the scale head mechanism will be obvious from the above description and drawing.

In Fig. 1 the locking mechanism of my invention is shown in operative position, i. e. in position for locking the pendulum cams and other elements of the dial head mechanism against movement. Thus, a lock bar 21 is shown in raised position, pressing upwardly pins 22 and 23 suitably fixed to cams 4 and 6. Pressing the pins upwardly lifts slightly the pivots on which the cams are mounted from their bearings 8, thus not only locking the dial head elements against movement but also preventing injury to the bearings while the scale is being moved from place to place.

The lock bar 21 is fixed to a horizontal bar 24 fixed to the upper extremities of lock rods 25. The rods 25 are supported in tubes or sleeves 26 within which are placed compression springs 27. Means are provided for guiding the vertical reciprocations of rods 25 and sleeves 26. Thus, the means for guiding rods 25 comprises a suitably apertured guide bar 28 fixed to a plate 29 which is in turn attached to framework 3 by screws 31. The sleeves 26 are guided in a suitably apertured upper portion 32 of a bracket 33 mounted on a bushing 34, arranged in the casing 35 housing the dial head mechanism. Compression springs 36 are carried on rods 25 between guide bar 28 and collars 37 held in position on said rods by means of set-screws 38.

The sleeves 26 supporting rods 25 are set in openings 39 in cam follower block 41 which rests on a cam 42 fixed, by means of a pin 43 to a shaft 44 journalled in and passing through bushing 34. The cam 41 is provided with flattened portion 45 to more firmly support the block 41 in operative and inoperative positions.

For rotating the cam 42, a hub 46 is fixed to one end of cam shaft 44 by means of a set-screw 47 and a handle 48 is supported in said hub. A locknut 49 is provided for holding the locking mechanism in position in casing 35.

In operation, the rotation of cam 42 so as to cause the flattened portion 45 thereof to come into contact with cam follower block 41 effects the locking of the cam 42 and block 41 against the action of compression springs 36. The flattened portion acts to maintain the locking elements in position. When the cam 42 is rotated to bring flattened portion 45 against the block 41, and thus free the pendulum cams and other elements for movement, the rods 25 drop. The fall thereof is cushioned by compression springs 27.

While the locking device of my invention has been shown as engaging pins on both pendulum cams for locking the dial head elements against movement, it will be appreciated that a locking engagement with only one of the cam pins, either the one on the compensating pendulum cam or the one on the load pendulum cam, will also lock all of the dial head elements.

The embodiment of my invention shown and described herein is to be considered merely as illustrative as the invention is susceptible to variation, modification and change within the spirit and scope of the appended claims.

What I claim as new and desire to secure by Letters Patent is:

1. In a weighing scale of the class described, the combination with load offsetting means comprising pendulum cams and pendulums mounted thereon, of a pin on each of said pendulum cams, a lock bar, and means for moving said lock bar upwardly into lifting engagement with at least one of said pins to lock said pendulum cams and pendulums against movement.

2. In a weighing scale of the class described, the combination with load offsetting means comprising pendulum cams and pendulums mounted thereon, of a pin on each of said pendulum cams, a lock bar, and means including a locking circular cam having diametrically opposite flats for moving said lock bar upwardly into lifting engagement with said pins to lock said pendulum cams and pendulums against movement.

3. In a weighing scale of the class described, the combination with load offsetting means comprising pendulum cams and pendulums mounted thereon, of a pin on each of said pendulum cams, a lock bar, means including a locking circular cam having diametrically opposite flats for moving said lock bar upwardly into lifting engagement with said pins to lock said pendulum cams and pendulums against movement, and means on said locking cam for maintaining said lock bar in position.

4. In a weighing scale of the class described, the combination with load offsetting means comprising pendulum cams and pendulums mounted thereon, of a pin on each of said pendulum cams, a lock bar, means including a locking circular cam having diametrically opposite flats for moving said lock bar upwardly into lifting engagement with said pins to lock said pendulum cams and pendulums against movement and a flattened surface on said locking cam for maintaining said lock bar in position.

5. In a weighing scale of the class described, the combination with load offsetting means comprising pendulum cams and pendulums mounted thereon, of a pin on each of said pendulum cams, a lock bar, rods attached to said lock bar, a block for holding said rods, and a locking circular cam having diametrically opposite flats for moving said block so as to cause said lock bar to engage said pins to lock said pendulum cams and pendulums against movement.

6. In a weighing scale of the class described, the combination with load offsetting means comprising pendulum cams and pendulums mounted thereon, of a pin on each of said pendulum cams, a lock bar, rods attached to said lock bar, a block for holding said rods, a locking circular cam having diametrically opposite flats on which said block is adapted to rest, and means for rotating said locking cam so as to raise said block to cause said lock bar to engage said pins to lock said pendulum cams and pendulums against movement.

7. In a weighing scale of the class described, the combination with load offsetting means comprising pendulum cams and pendulums mounted thereon, of a pin on each of said pendulum cams, a lock bar, rods attached to said lock bar, sleeves for supporting said rods, a block for holding said sleeves, a rotatable locking circular cam having diametrically opposite flats for moving said block so as to cause said lock bar to engage said pins to lock said pendulum cams and pendulums against movement, and means for rotating said rotatable locking cam.

8. In a weighing scale of the class described, the combination with load offsetting means comprising pendulum cams and pendulums mounted thereon, of a pin on each of said pendulum cams, a lock bar, rods attached to said lock bar, compression springs on said rods, sleeves for supporting said rods, a block for holding said sleeves, a rotatable locking circular cam having diametrically opposite flats for moving said block, said sleeves, said rods and said lock bar against the action of said compression springs, so as to cause said lock bar to engage said pins to lock said pendulum cams and pendulums against movement, and means for rotating said rotatable locking cam.

9. In a weighing scale of the class described, the combination with load offsetting means comprising pendulum cams and pendulums mounted thereon, of a pin on each of said pendulum cams, a lock bar, rods attached to said lock bar, compression springs on said rods, sleeves for supporting said rods, compression springs in said sleeves, a block for holding said sleeves, a rotatable locking circular cam having diametrically opposite flats for moving said block, said sleeves, said rods and said lock bar against the action of said first mentioned compression springs, so as to cause said lock bar to engage said pins to lock said pendulum cams and pendulums against movement, and means for rotating said rotatable locking cam.

10. In a weighing scale of the class described, the combination with load offsetting means comprising pendulum cams and pendulums mounted thereon, of a pin on each of said pendulum cams, a lock bar, rods attached to said lock bar, compression springs on said rods, sleeves for supporting said rods, compression springs in said sleeves, a block for holding said sleeves, a rotatable locking circular cam having diametrically opposite flats for moving said block, said sleeves, said rods and said lock bar against the action of said first mentioned compression springs, so as to cause said lock bar to engage said pins to lock said pendulum cams and pendulums against movement, a flattened surface on said rotatable cam cooperating with said block to maintain said lock bar in locking position, and means for rotating said rotatable locking cam.

11. In a locking structure for weighing scales of the type having counterbalancing and offsetting pendulums to prevent injury to the elements of the dial head mechanism upon transportation from place to place while in use and to raise and hold the pendulum cams of such scales out of pivotal engagement with their bearings, said structure including a lock bar, a plurality of lock rods connected to said lock bar, guide means for said lock rods, a rotatable cam member for elevating and lowering said lock bar, coil spring members for bearing said bar and rods downwardly and coil spring members for cushioning the movement of said rods upon downward movement.

12. The structure of claim 11 in which the guide means include sleeves for receiving said rods and an apertured guide bar for receiving and through which said rods project.

13. A weighing scale of the type having load counterbalancing and offsetting pendulums including a locking device to be readily and quickly moved into engagement with the pendulum cams to hold them out of pivotal engagement with their bearings and thereby restraining the dial head mechanisms against movement, said device including pendulum cams provided with pins fixed thereto, a lock bar for pressing said pins upwardly and lifting the cams from their bearings, lock rods attached to said lock bar, guiding sleeves for said lock rods receiving compression springs, a cam follower block attached to the lower ends of said lock rods, and a circular cam having opposite flats to support said block in opposite operative and inoperative positions.

LESTER D. SINGLETON.

REFERENCES CITED

The following references are of record in the file of this patent:

UNITED STATES PATENTS

| Number | Name | Date |
|---|---|---|
| 156,259 | Schmolz | Oct. 27, 1874 |
| 1,103,513 | Heusser | July 14, 1914 |
| 1,267,549 | Hert | May 28, 1918 |
| 1,564,387 | Wesley | Dec. 8, 1925 |
| 1,577,009 | Wetzel | Mar. 16, 1926 |
| 1,606,938 | Hem | Nov. 16, 1926 |
| 1,671,261 | Thomas | May 29, 1928 |
| 2,034,847 | Timson | Mar. 24, 1936 |
| 2,233,868 | Kish | Mar. 4, 1941 |
| 2,404,601 | Seyter | July 23, 1946 |